United States Patent Office 3,758,433
Patented Sept. 11, 1973

3,758,433
PRESSURE SENSITIVE ADHESIVES
James Nelson Mullen, Kilwinning, Scotland, assignor to Imperial Chemical Industries Limited, London, England
No Drawing. Filed Aug. 25, 1971, Ser. No. 175,004
Claims priority, application Great Britain, Sept. 1, 1970, 41,734/70
Int. Cl. C08f 37/00
U.S. Cl. 260—29.6 E                16 Claims

ABSTRACT OF THE DISCLOSURE

A pressure sensitive adhesive of particular use with regard to "wash-off" labels comprises a blend of a 1:1 alternating copolymer of maleic acid and methyl vinyl ether with an alkyl phenol polyethylene oxide condensate as plasticiser.

---

This invention relates to pressure sensitive adhesives.

More particularly, but not exclusively, the present invention relates to pressure sensitive adhesives which are eminently suitable for the production of "wash-off" labels and like objects.

Pressure sensitive adhesives comprising a polyvinyl carboxylic acid blended with a polyalkylene glycol as plasticiser are well known. Such adhesives are useful and valuable commercial products but they do possess certain disadvantages, one of which is that they are not suitable for the aforementioned "wash-off" labels. The reason for this is that the dry adhesive can be readily peeled from a smooth surface such as a glass surface. Whilst this is undoubtedly a desirable property in certain applications, it is a definite disadvantage in the fixing of labels to bottles where it is desirable that the dried film of adhesive should not be able to be pulled from the glass too easily.

It is thus an object of the present invention to provide an improved adhesive which obviates or mitigates the aforesaid disadvantage.

According to the present invention there is provided a water-soluble pressure sensitive adhesive comprising a blend of a 1:1 alternating copolymer of maleic acid and methyl vinyl ether, or a water-soluble partial ester thereof, with an alkyl phenol polyethylene oxide condensate as plasticiser.

The plasticiser of the adhesive is preferably a liquid alkyl phenol polyethylene oxide condensate containing 7 to 10 ethylene oxide units.

The alkyl group of the plasticiser preferably contains six to twenty carbon atoms and advantageously eight or nine carbon atoms.

The adhesive advantageously contains an excess of the plasticiser over the maleic acid/methyl vinyl ether copolymer or water-soluble partial ester thereof.

The plasticisers included in the adhesives are characterised by the fact that they present a single hydroxyl group at the end of the polymeric chain. This is in contradistinction to the aforementioned polyalkylene glycol plasticisers of the prior art adhesives which possess two hydroxyl groups per molecule. The reduced number of hydroxyl groups in the adhesives used in the present invention alters the adhesive power and stability to such an extent that the dried adhesive cannot be peeled dry from dry, smooth surfaces which, as aforesaid, is a definite advantage with regard to the fixing of labels to bottles. Since, however, our adhesives are water-soluble, labels can be readily peeled from glass whenever they have been treated with water.

A further factor affecting the stability of our adhesives, with particular reference to ageing action, is the fact that the phenol group of the plasticiser is connected to the polyethylene oxide entity by an ether linkage, which linkage is stable to hydrolysis.

When preparing the adhesives of the present invention it is advantageous to employ the free acid form of the copolymer. If the anhydride form is used the anhydride groups should be hydrolysed before adding the plasticiser in order to circumvent esterification with the plasticiser.

In practice, the preferred method of making the adhesive is to slowly add the free acid form of the copolymer to a suitable volatile solvent with stirring. Suitable solvents are water, industrial methylated spirits (IMS) or mixtures thereof. The plasticiser is added after the copolymer has dissolved in the solvent. The solvent is present in such quantity as to provide a suitable coating viscosity.

The present invention is also, therefore, an aqueous or alcoholic solution of an adhesive composition as described above.

As an alternating to using the free acid form of the copolymer it is also convenient to use selected water-soluble esters of the copolymer. These selected esters may be obtained by hydrolysing the anhydride form of the copolymer in aqueous alcohol. As in the case of the free acid grade described above it is important to ensure that no anhydride groups remain after hydrolysis and partial esterification.

These water-soluble esters may be prepared from alcohols having 1–8 carbon atoms, preferably 1–3 carbon atoms.

The preferred alcohols are isopropanol, ethanol or industrial methylated spirits, or mixtures thereof.

These esters can retain water-solubility as long as only up to 50% of the carboxyl groups of the copolymer are esterified. The preferred degree of esterification is 5–40%.

Water soluble pressure sensitive adhesives according to the invention can advantageously be formulated from 50% partial ethyl esters and from partial ethyl and isopropyl esters having a degree of esterification less than 50%. The preferred formulations however are those based on the isopropyl ester with a lower degree of esterification, e.g. the isopropyl ester having 20–25% (22%) esterification is recommended due to the very low free water content remaining after the esterification in aqueous alcohol.

As indicated above it is important to esterify sufficiently to get cold water solubility since if there is too much esterification the product is insoluble. Excess alcohol is present in the aqueous solution and the product is a solution of about 40% solids content. By this procedure, simultaneous hydrolysis and esterification takes place, some of the anhydride groups of the compolymer being attacked immediately to give ester groups whilst others are hydrolysed to give free carboxyl groups. Free carboxyl groups are more difficult to esterify than anhydride groups and so less than 50% esterification takes place which results in a water soluble product being obtained.

It is advantageous to use excess alcohol in the aqueous solution for its solvent action. If there is insufficient alcohol present to give a solution then a tacky unmanageable product is obtained.

Tertiary alcohols are preferred since they do not esterify as readily as primary alcohols and so by keeping esterification down water solubility is increased.

As stated previously, the adhesive of the invention may advantageously be used in the production of "wash-off" labels but it may also be applied to other conventional backing materials such as cellophane, metal foil, tape or cloth.

From another aspect the present invention is a "wash-off" label or like object comprising a backing material representing the label or like object coated with an adhesive composition comprising a blend of a 1:1 alternating copolymer of maleic acid and methyl vinyl ether, or a water-soluble partial ester thereof, with an alkyl phenol polyethylene oxide condensate as plasticiser.

Preferably said backing material comprises a lightly calendered kraft paper.

Further preferably the coated backing material has a release paper applied to the coating, which release paper is removed prior to applying the backing material to a glass bottle or the like.

The release paper is advantageously polyvinyl alcohol primed and silicone coated.

The invention is further illustrated by the following examples in which all parts and percentages are by weight.

EXAMPLE 1

17 parts of the anhydride form of a 1:1 copolymer of maleic anhydride and methyl vinyl ether were added to 52 parts water and heated to 90° C. with stirring for 40–45 minutes to give a clear solution. The copolymer was then present in the free acid form. 31 parts of a nonyl phenol/polyethylene oxide condensate (7 ethylene oxide units) as plasticiser were then added with slow stirring to prevent excessive foaming and stirring continued until the mixture was homogeneous. The solution was slightly turbid and yellow coloured with a viscosity of 13,200 cps. (LVT 4/30) at 25° C.

Up to 10 parts of the water may be replaced by IMS 66 o.p., added after hydrolysis. The IMS addition results in a clear solution.

The methyl vinyl ether/maleic anhydride copolymer used was such that when neutralised with caustic soda to pH 7 the viscosity of a 5% aqueous solution, as measured on a Brookfield LVT Viscometer with a spindle 1 and a speed of 30 r.p.m., was 100±25 cps. at 25° C.

EXAMPLE 2

The procedure of Example 1 was repeated, only this time the plasticiser was an octylphenoxypolyethoxyethanol (9–10 ethylene oxide units on average).

EXAMPLE 3

19 parts of the free acid form of a maleic anhydride/methyl vinyl ether copolymer of Example 1 were added slowly to 50 parts water and stirred until dissolved (circa 1–2 hours). 31 parts of the nonyl phenol/ethylene oxide condensate plasticiser of Example 1 were then added and mixed until homogeneous. A clear yellow coloured solution was obtained.

The water can be replaced by IMS or a water/IMS mixture. In the absence of IMS, care must be taken to avoid excessive foaming.

The viscosity at 25° C. of a solution containing 100% IMS was 2,200 cps. (LVT 3/30).

EXAMPLE 4

The procedure of Example 3 was repeated but this time using the octylphenoxypolyethoxyethanol plasticiser of Example 2.

The plasticised adhesives prepared according to all of the above four examples still exhibited tackiness and water-solubility after 24 hours at 70° C.

Labels coated with the adhesives of Examples 3 and 4, prepared using IMS 66 o.p. as solvent, were produced and the adhesives evaluated by subjecting them to peel adhesion tests, shear tests and also measuring their storage stability at various temperatures. The results were as follows

Peel adhesion test

Lightly calendered kraft paper was coated with the formulations of Examples 3 and 4 as follows. A 50% (by weight) solution of the adhesive was applied to the kraft paper with a Conway-Bray coater bar (0.032 gauge) and dried for 10 minutes with a hot air dryer. The actual coating weight in each case was approximately 22 g./metre$^2$. Release paper was then applied, said release paper being polyvinyl alcohol primed and silicone-coated.

The adhesion to glass was determined by pulling a 1 in. wide x 6 in. long strip of coated paper off glass at 180° using a pulling speed of 12 in./min. The strips were applied to a glass plate, a 2,000 g. roller passed over them three times and allowed to age for 5 minutes before measuring the adhesion. The results were as follows:

Example 3—Peel adhesion 865 g./in.
Example 4—Peel adhesion 850 g./in.

Shear test

A 1 in. wide strip of coated paper about 2–3 in. long was applied to a vertical glass plate such that 1 in. of its length adhered to the glass and the remainder being below the plate. A 4 lb. weight was attached vertically to the loose end of the paper and the time for the adhesive bond to fail noted. The results were as follows:

Example 3—Shear time 5.12 hours
Example 4—Shear time 5.79 hours.

Storage stability

Lightly calendered kraft paper coated, as described above, with the formulations of Examples 3 and 4 were stored at elevated (70° C.) and room temperatures. Shear test and peel adhesion determinations were carried out at intervals on samples stored at 70° C. and room temperature respectively. The water-solubility of the films was also examined.

STORAGE STABILITY AT 70° C.

| Time stored (hours) | Shear time (hours) | | Film properties, Examples 3 and 4 |
|---|---|---|---|
| | Example 3 | Example 4 | |
| 0 | 5.12 | 5.79 | Water-soluble and tacky. |
| 3 | | 6.23 | Do. |
| 6 | 11.18 | 19.42 | Do. |
| 24 | >100 | >100 | Still water-soluble but less tacky. |

The increase in shear time found on storage at 70° C. was accompanied by a decrease in tackiness of the adhesive.

STORAGE STABILITY AT ROOM TEMPERATURE

| Time stored (weeks) | Peel adhesion (g./in.) | | Film properties |
|---|---|---|---|
| | Example 3 | Example 4 | |
| 0 | 865 | 860 | Water-soluble and tacky. |
| 1 | 900 | 815 | Do. |
| 2 | 845 | 890 | Do. |
| 4 | 860 | 795 | Do. |
| 8 | 915 | 900 | Do. |
| 12 | 825 | 865 | Do. |

50% w./w. solution of the adhesive formulations were heated at 50° C. for 5–6 hours and cooled. The shear test and peel adhesion results obtained from paper coated with the heated solution remained unchanged.

EXAMPLE 5

80 parts of a maleic anhydride/methyl vinyl ether copolymer (as used in the previous examples), were placed in a 500 ml. three necked round bottomed flask fitted with a stirrer and reflux condenser. 150 parts of dry isopropanol and 9 parts water were added to the flask which was then heated on a hot water bath at 80–100° C. for a period of four hours or at least until a clear solution was obtained. The flask was cooled to give an approximate 40% solution of the acid/ester (22% esterification) which was suitable for incorporating into an adhesive formulation of the invention according to the following procedure.

33 parts of a nonyl phenol/polyethylene oxide condensate (7 ethylene oxide units) as a plasticiser were added to 25 parts industrial methylated spirits (66 o.p.) and stirred for 5 to 10 minutes until the plasticiser went into solution. 41.7 parts of the acid/ester solution prepared as above were then added with stirring which was continued for about 1 hour until the mixture was homogeneous. A clear yellow solution was formed with a viscosity of 4,800 cps. (LVT 4/30) at 25° C. When subjected to peel adhesion and shear tests and measured for storage stability as before, this formulation was found to be eminently suitable for use as a pressure sensitive adhesive.

The adhesive formulation may also be prepared by adding the plasticiser and industrial methylated spirits, either separately or together, to the ester solution with stirring.

A similar adhesive formulation with octylphenoxypolyethoxyethanol (9–10 ethylene oxide units) replacing the previous plasticiser, was also found to be satisfactory.

What I claim is:

1. A water-soluble pressure sensitive adhesive consisting essentially of a blend of a 1:1 alternating copolymer of maleic acid and methyl vinyl ether, or a water-soluble partial ester thereof, with an alkyl phenol polyethylene oxide condensate as plasticiser.

2. An adhesive as claimed in claim 1 wherein the plasticiser is a liquid alkyl phenol polyethylene oxide condensate containing 7 to 10 ethylene oxide units.

3. An adhesive as claimed in claim 1 wherein the alkyl group of the plasticiser contains six to twenty carbon atoms.

4. An adhesive as claimed in claim 1 wherein the plasticiser is a nonyl phenol/polyethylene oxide condensate containing 7 ethylene oxide units.

5. An adhesive as claimed in claim 1 wherein the plasticiser is octylphenoxypolyethoxyethanol having 9–10 ethylene oxide units.

6. An adhesive as claimed in claim 1 containing an excess of the plasticiser over the maleic acid/methyl vinyl ether copolymer or water-soluble partial ester thereof.

7. An adhesive as claimed in claim 1 wherein the water-soluble partial ester is prepared from an aqueous solution of an alcohol having 1–8 carbon atoms and has a degree of esterification of less than 50%.

8. An adhesive as claimed in claim 7 wherein the water-soluble partial ester is prepared from an aqueous solution of an alcohol having 1–3 carbon atoms and has a degree of esterification of 5–40%.

9. An adhesive as claimed in claim 8 wherein the water-soluble partial ester is prepared from an aqueous solution of ethanol, isopropanol, industrial methylated spirits or mixtures thereof.

10. An adhesive as claimed in claim 9 wherein the water-soluble partial ester is prepared from an aqueous solution of isopropanol and has a degree of esterification of 20–25%.

11. An adhesive as claimed in claim 8 wherein the aqueous solution contains an excess of alcohol.

12. A method of manufacturing an adhesive composition as claimed in claim 1 wherein the plasticiser is mixed with a solution of the copolymer in a compatible volatile solvent.

13. A method as claimed in claim 12 wherein the volatile solvent is water, industrial methylated spirits or mixtures thereof.

14. A method as claimed in claim 12 wherein the anhydride form of the copolymer is hydrolysed with water and the plasticiser is mixed into the thus formed aqueous solution of copolymer.

15. A method of manufacturing an adhesive composition as claimed in claim 1 comprising hydrolysing the anhydride form of the copolymer with an aqueous solution of an alcohol having 1–8 carbon atoms and thereafter mixing the plasticiser with the thus formed partial ester solution.

16. An aqueous or alcoholic solution of an adhesive composition as claimed in claim 1.

References Cited
UNITED STATES PATENTS

| | | | |
|---|---|---|---|
| 2,793,966 | 5/1957 | Davis | 260—29.6 |
| 2,838,421 | 6/1958 | Sohl | 117—122 |
| 3,441,430 | 4/1969 | Peterson | 117—68.5 |
| 3,556,835 | 1/1971 | Sorell | 117—68.5 |

FOREIGN PATENTS 798,806   7/1958   Great Britain.

MELVIN GOLDSTEIN, Primary Examiner

U.S. Cl. X.R.

117—155 VA; 260—33.2